(12) United States Patent
Heller et al.

(10) Patent No.: US 6,223,872 B1
(45) Date of Patent: May 1, 2001

(54) HYDRODYNAMIC TORQUE CONVERTER

(75) Inventors: Jean-Francois Heller, Illkirch-Graffenstaden (FR); Thomas Heck; Steven Olsen, both of Wooster, OH (US); Rudolf Hönemann, Ottersweier (DE)

(73) Assignee: LuK Getriebe-Systeme GmbH, Buhl/Baden (DE)

( * ) Notice: Subject to any disclaimer, the term of this patent is extended or adjusted under 35 U.S.C. 154(b) by 0 days.

(21) Appl. No.: 09/514,443

(22) Filed: Feb. 25, 2000

Related U.S. Application Data

(63) Continuation of application No. PCT/DE98/02549, filed on Aug. 25, 1998.

(30) Foreign Application Priority Data

| Aug. 26, 1997 | (DE) | 197 37 022 |
| Aug. 29, 1997 | (DE) | 197 37 782 |
| Sep. 12, 1997 | (DE) | 197 40 151 |
| Oct. 30, 1997 | (DE) | 197 47 924 |
| Jan. 22, 1998 | (DE) | 198 02 212 |

(51) Int. Cl.$^7$ ..................................... F16H 45/02
(52) U.S. Cl. ........................... 192/3.29; 192/213
(58) Field of Search ................... 192/3.29, 3.3, 192/213, 70.17

(56) References Cited

U.S. PATENT DOCUMENTS

| 5,511,640 | * | 4/1996 | Fukunaga | 192/3.3 X |
| 5,860,500 | * | 1/1999 | Olsen et al. | 192/3.29 |
| 5,964,329 | * | 10/1999 | Kawaguchi et al. | 192/3.3 |
| 5,975,261 | * | 11/1999 | Woerner et al. | 192/3.29 |
| 6,070,704 | * | 6/2000 | Sasse | 192/3.29 X |
| 6,079,529 | * | 6/2000 | Hinkel et al. | 192/3.29 X |

* cited by examiner

*Primary Examiner*—Rodney H. Bonck
(74) *Attorney, Agent, or Firm*—Darby & Darby

(57) ABSTRACT

The hydrodynamic torque converter (1) comprises a pump wheel (4) in a casing (2,3), a turbine wheel (5) and a turbine distributor (6). There is also a bypass coupling (70) including an axially moving piston, a torsional oscillations absorber (40) with input and output parts rotating relative to each other in opposition to force accumulators. Its turbine wheel comprises a hub (13) housed axially on the torque converter output hub (15). A connection with the rotational clearance, the splines (32,34), is provided between the two hubs. A fixed connection, by splines (34,41*a*) is between the input part of the absorber and the turbine wheel hub. The two sets of splines are in the same axial position radially one in the other.

25 Claims, 11 Drawing Sheets

Schubseite    Zugseite

HYDRODYNAMIC TORQUE CONVERTER

Figure 1:
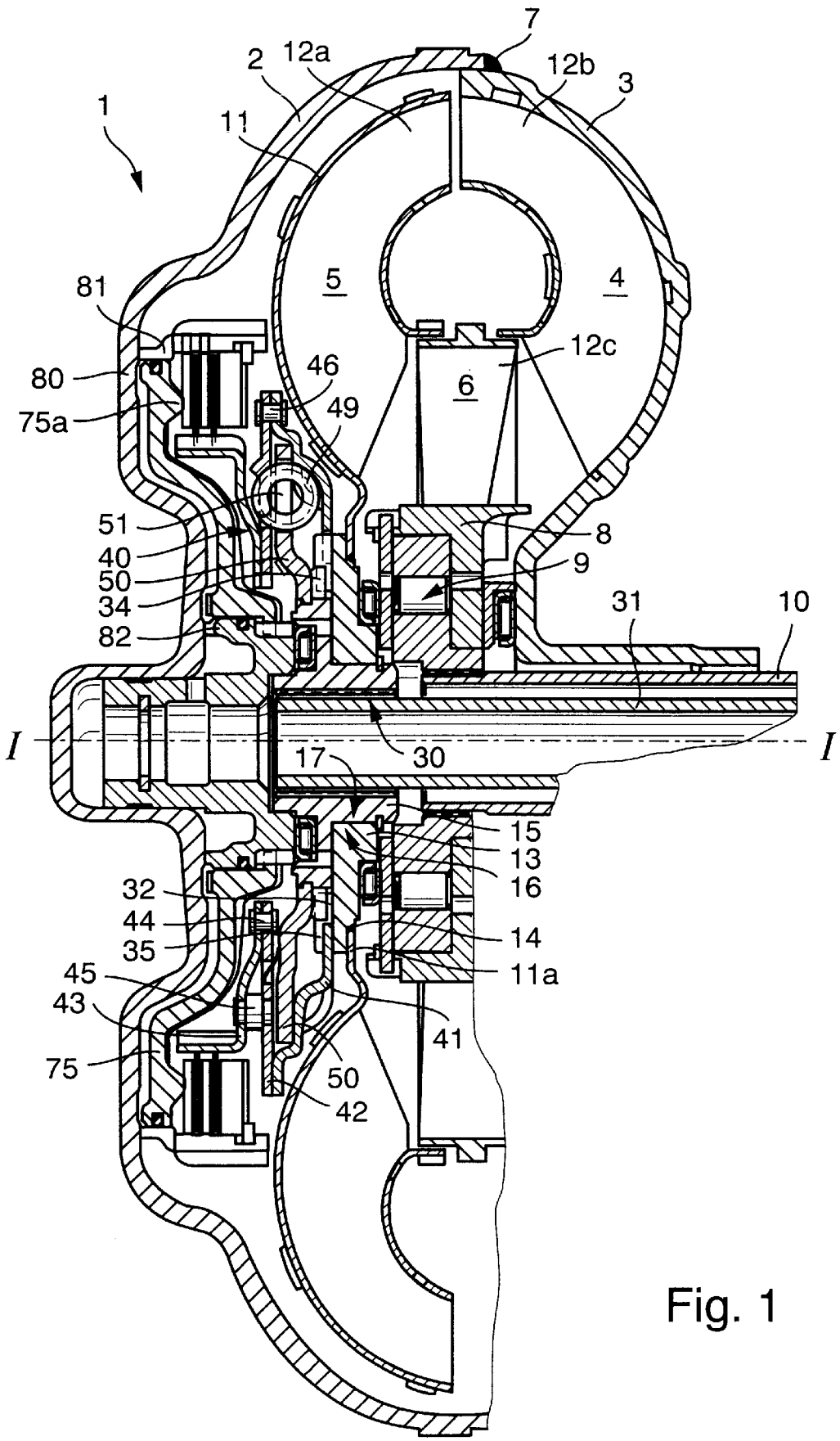

This is a continuation of International Application No. PCT/DE98/02549, filed Aug. 25, 1998, the entire disclosure of which is hereby incorporated by reference.

The invention relates to a hydrodynamic torque converter having a pump wheel mounted in a housing, a turbine wheel and where necessary a stator, with a torque converter lock-up clutch with an axially displaceable piston and a torsional vibration damper with an input part and output part which are able to rotate relative to each other at least against the resetting force of energy accumulators arranged between same.

Hydrodynamic torque converters of this kind are known for example from DE OS 195 14 411. With these torque converters according to the prior art the turbine wheel has its own turbine wheel hub which is connected through play-afflicted engaging gear to a corresponding engaging gear of an output hub with circumferential backlash, wherein the torque from the turbine wheel on the drive side is transferred on the one hand through the output part of the damper to the output part of the damper and from there to the output hub, and on the other hand during the lock-up of the circumferential backlash between the turbine hub and the output hub directly from the turbine wheel to the output hub.

The object of the invention is to provide a hydrodynamic torque converter of the type already mentioned which compared to the prior art is simple and cost-effective to manufacture by allowing for example cost-intensive finishing steps to be reduced or eliminated.

Furthermore it is the object of the invention to provide a torque converter which has a space-saving design since the installation chambers being provided for torque converters are becoming more and more compact.

This is achieved according to the invention in that the turbine wheel has a turbine hub which is axially and rigidly mounted on an output hub of the torque converter in the axial direction relative to the output hub by means of at least one axial bearing and is mounted in the radial direction by means of a radial bearing, a connection with circumferential backlash is provided between the turbine hub and the output hub by means of a disengaging gear and furthermore a rotationally secured connection is provided by means of an engaging gear between the input part of the torsional vibration damper and the turbine hub, with the engaging gear and the disengaging gear being mounted substantially on the same axial position and radially within one another. The terms "gear" and "gearing" are used herein interchangeably with "toothed profiles" or "splines", with the general meaning of toothed circumferences by which components of the torque converter may be rotationally constrained to each other. "Engaging gearing" means a connection without rotational play, while "disengaging gearing" means a connection with rotational play (also referred to as backlash).

According to a further inventive idea this is also achieved with a hydrodynamic torque converter having a pump wheel mounted inside a housing, a turbine wheel and a stator, as well as a converter lock-up clutch with an axially displaceable piston, with a torsional vibration damper with an input part and an output part which are able to rotate relative to each other at least against the resetting force of energy accumulators mounted between same, in that the turbine wheel has a turbine hub which is axially and rigidly mounted on an output hub of the torque converter in the axial direction relative to the output hub and is mounted in the radial direction by a bearing, a connection with circumferential backlash is provided between the turbine hub and the output hub by means of an disengaging gear and furthermore a rotationally secured connection is provided by means of an engaging gear between the input part of the torsional vibration damper and the turbine wheel hub, wherein the output part of the torsional vibration damper and the output hub are formed in two parts and are connected together by staking or welding.

Furthermore according to a further inventive idea it is expedient if in the case of a hydrodynamic torque converter having a pump wheel mounted inside a housing, a turbine wheel and a stator, as well as a converter lock-up clutch with an axially displaceable piston, with a torsional vibration damper with an input part and an output part which are able to rotate relative to each other at least against the resetting force of first and second energy accumulators mounted between same, the turbine wheel has a turbine hub which is axially and rigidly mounted on an output hub of the torque converter in the axial direction relative to the output hub and is mounted in the radial direction by a bearing, a connection with circumferential backlash is provided between the turbine hub and the output hub by means of an engaging gear and furthermore a rotationally secured connection is provided by means of an engaging gear between the input part of the torsional vibration damper and the turbine hub, wherein first energy accumulators mounted between the input part and output part of the torsional vibration damper are mounted substantially without circumferential backlash between same, whilst second energy accumulators mounted between the input part and output part of the torsional vibration damper are mounted with circumferential backlash between same.

It is thereby advantageous if the input part of the torsional vibration damper is formed by two disc like component parts, such as side discs, fixedly connected together, and the output part of the torsional vibration damper, such as a flange, is formed by one disc-like element and is mounted axially between same, wherein first and second socket areas are provided for housing the first and second energy accumulators in the input and output parts, wherein the first and second socket areas of the input part and the first socket areas of the output part have in the circumferential direction substantially the extension of the energy accumulators in this direction, and the second socket areas in the output part have in the circumferential direction substantially a larger extension than the extension of the energy accumulators in this direction.

Furthermore it is expedient if the first energy accumulators in the event of torsion between the input and output parts of the torsional vibration damper are biased with force in the circumferential direction immediately or after a slight circumferential backlash between the input and output parts and the second energy accumulators in the event of rotation between the input and output parts of the torsional vibration damper are only biased with force in the circumferential direction after a predeterminable turning angle between the input and output parts.

It is likewise expedient if the input part is rotatable relative to the output part in the drive direction up to a first maximum torsion angle and is rotatable in the coast direction up to a second maximum torsion angle.

It is particularly advantageous if the first maximum torsion angle is greater than the second maximum torsion angle.

It is furthermore expedient if the first maximum torsion angle is smaller than or equal to the second maximum torsion angle.

According to a further inventive idea it is expedient if the predeterminable torsion angle between the input part and output part after which when exceeded the second energy accumulators between the input and output parts of the torsional vibration damper are biased with force, is smaller in the drive direction than the first maximum torsion angle.

In a further embodiment of the invention it is likewise advantages if the predeterminable torsion angle between the input and output parts after which when exceeded the second energy accumulators between the input and output part of the torsional vibration damper are biased with force is greater in the drive direction than the second maximum torsion angle.

According to a further inventive idea it is particularly expedient if at least one of the energy accumulators is a curved energy accumulator whose outer contour is pre-curved in an arc.

According to a further inventive idea it is expedient if a bayonet lock is provided between the output hub, the turbine hub and the input part of the torsional vibration damper, wherein a rotationally secured connection is provided between the turbine hub and the input part, and a rotational connection with backlash is provided between the output hub and the turbine hub.

According to a further inventive idea it is expedient if the torque converter lock-up clutch is formed as a multi-plate clutch with a radially outer plate support and a radially inner plate support wherein the radially outer plate support is connected fixed to the housing and the radially inner plate support is connected radially outside of the energy accumulators of the torsional vibration damper rotationally secured to the input part of the torsional vibration damper.

It is thereby expedient if the radially inner plate support has a cylindrical region and the connection between the plate support and the input part of the torsional vibration damper is radially outside of the cylindrical region.

According to a further inventive idea it is expedient if the torque converter lock-up clutch is formed as a multi-plate clutch with a radially outer plate support and a radially inner plate support wherein the radially outer plate support is connected fixed to the housing and the radially inner plate support is connected radially inside the energy accumulators of the torsional vibration damper rotationally secured to the input part of the torsional vibration damper.

It is thereby expedient if the radially inner plate support has a cylindrical region and the connection between the plate support and the input part of the torsional vibration damper takes place radially inside the cylindrical region.

It is likewise expedient if a rotationally secured connection between the turbine wheel and the input part of the torsional vibration damper takes place radially outside of the energy accumulators of the torsional vibration damper.

It is further advantageous if a rotationally secured connection between the turbine wheel and the input part of the torsional vibration damper is produced by means of tongues fixed on the turbine wheel and teeth provided radially outside on the input part of the torsional vibration damper. It is thereby advantageous if the tongues are fixed individually on the turbine wheel, such as by welding. In another embodiment the tongues are advantageous formed in one piece on a ring-shaped element and this element is fixed, such as welded to the turbine wheel.

It is expedient if the axial bearing of the turbine wheel hub is provided by a security ring which has an outer ring and inner ring and when the turbine hub is fitted on the output hub the outer ring is released axially from the inner ring and the inner ring is relaxed in the radial direction and secures the turbine hub.

It is likewise expedient if the outer ring and inner ring are formed integral with an ideal break point between same.

It is thereby advantageous if the outer ring and inner ring are formed in two pieces and are arranged radially one above the other.

It is likewise expedient if the turbine wheel hub is formed as a shaped sheet metal part. In a further embodiment it is advantageous if the turbine hub is formed as a sintered part.

Figure 2:
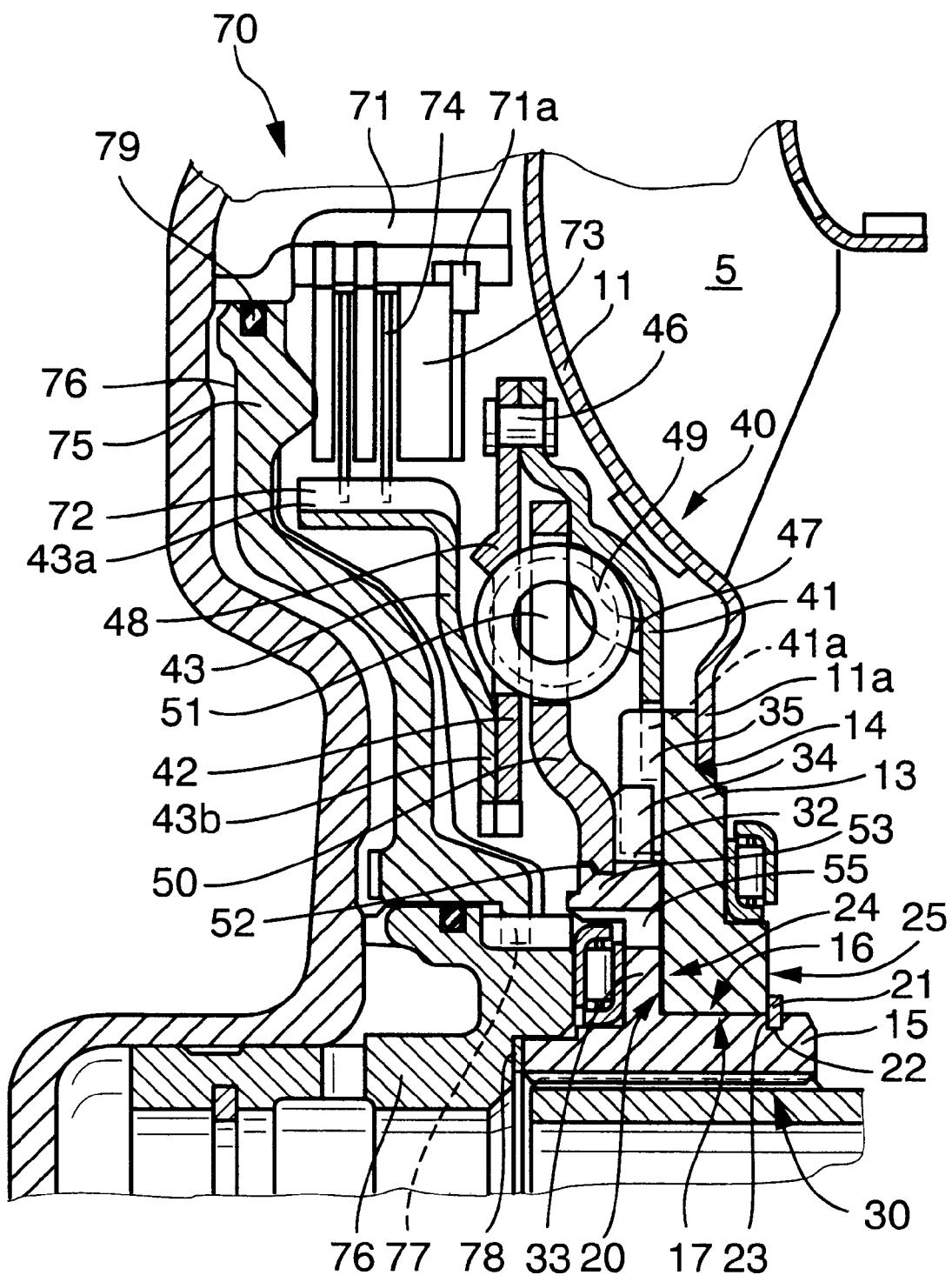
Figure 3:
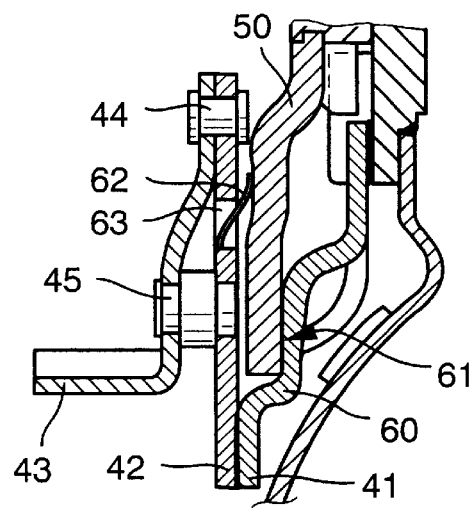
Figure 4:
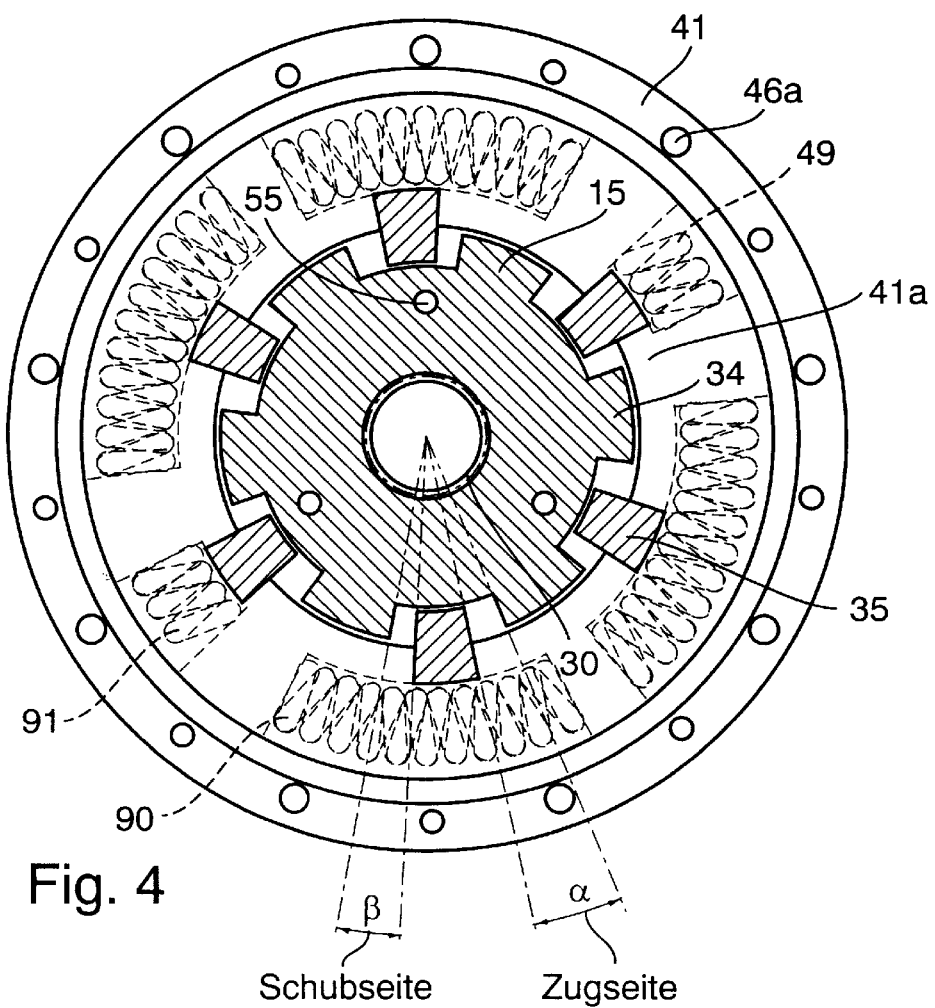
Figure 5:
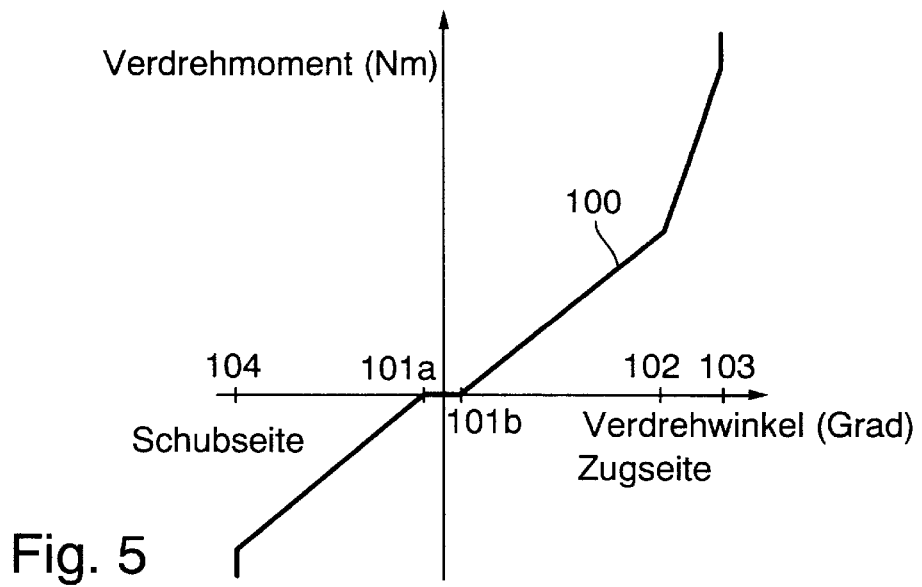
Figure 6:
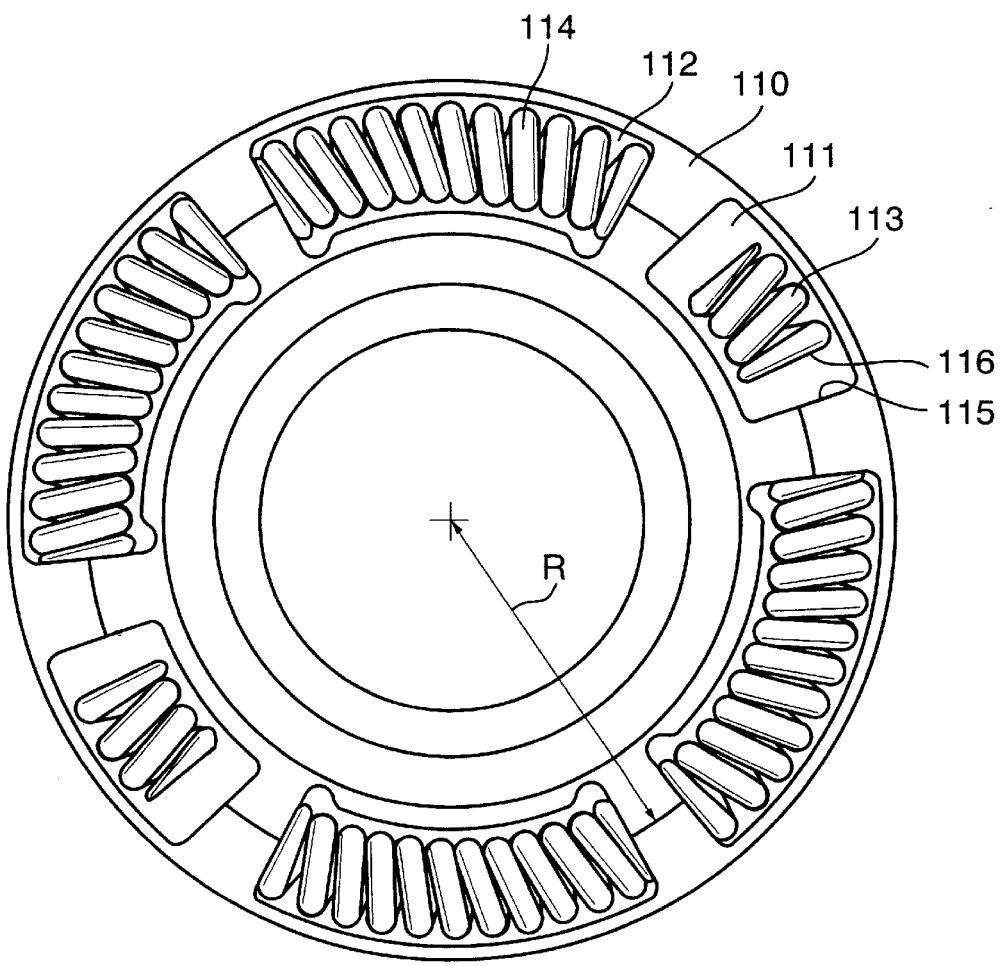
Figure 7A:
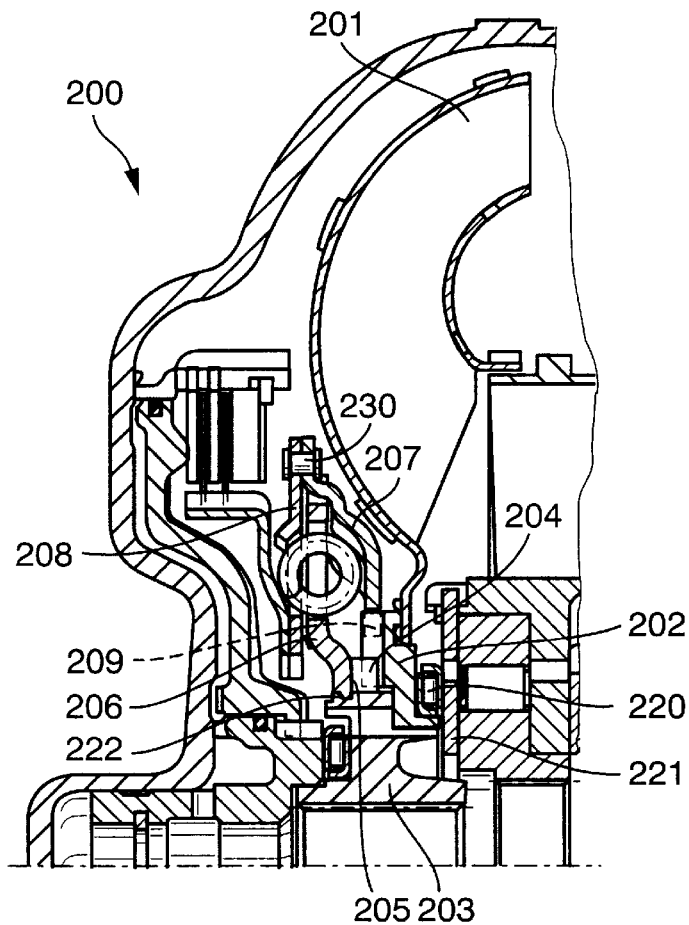
Figure 7B:
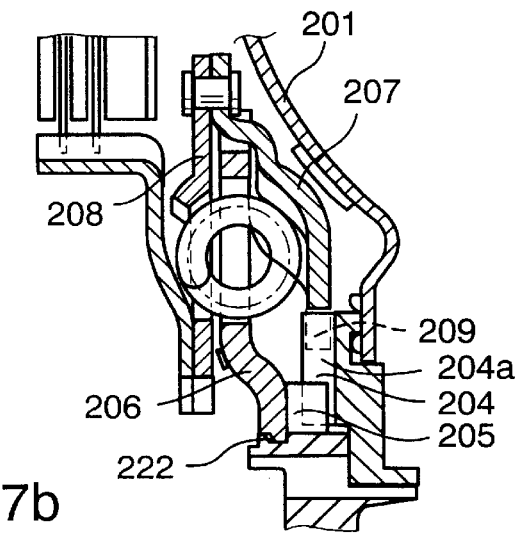
Figure 7C:
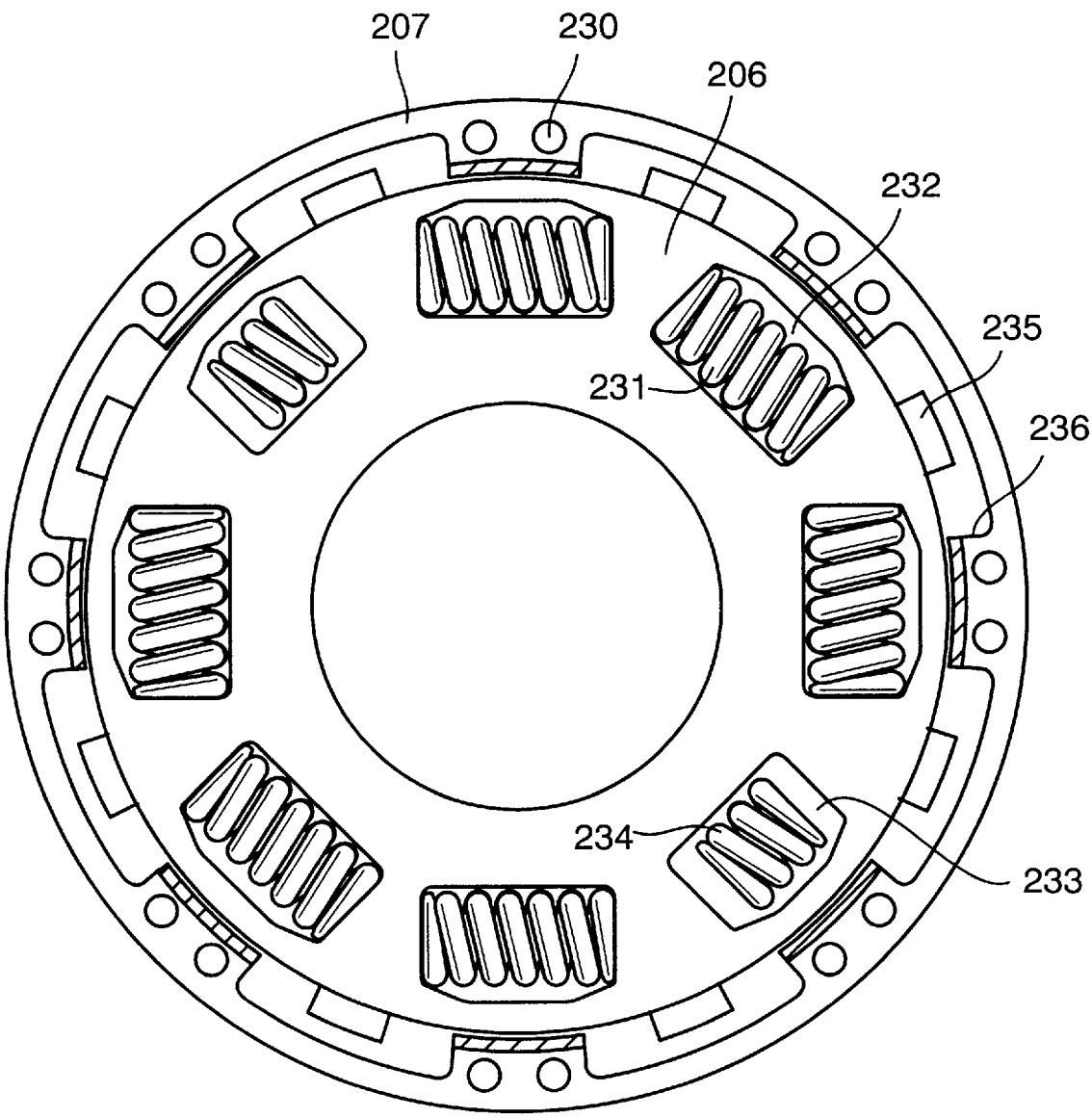
Figure 9:
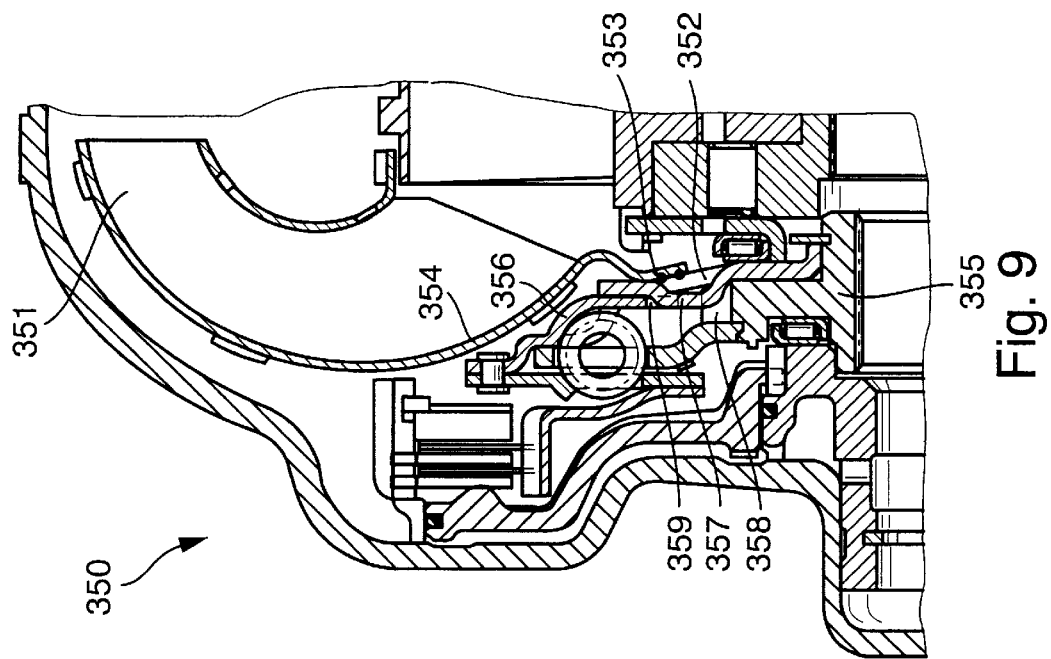
Figure 8:
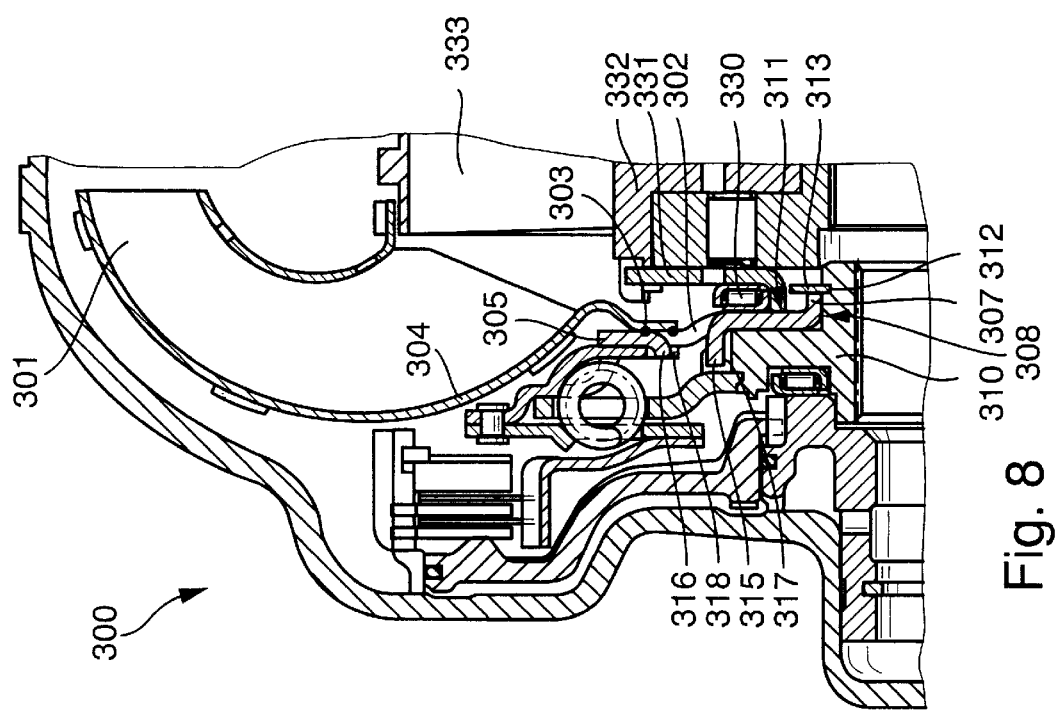
Figure 10:
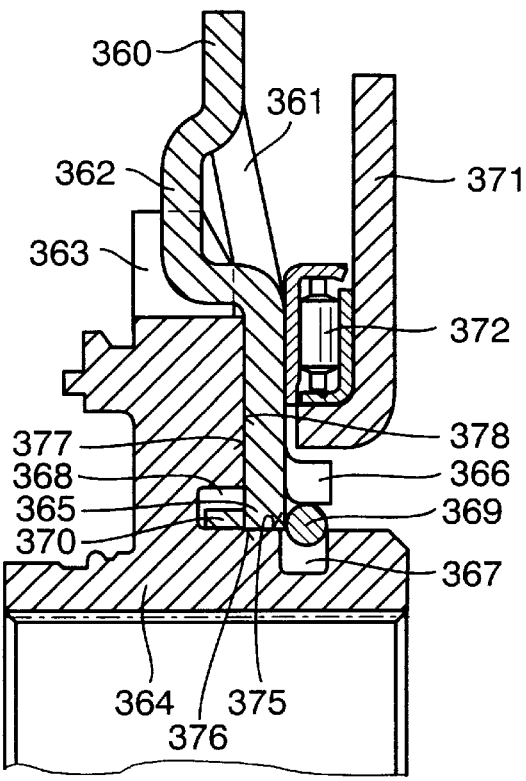
Figure 11:
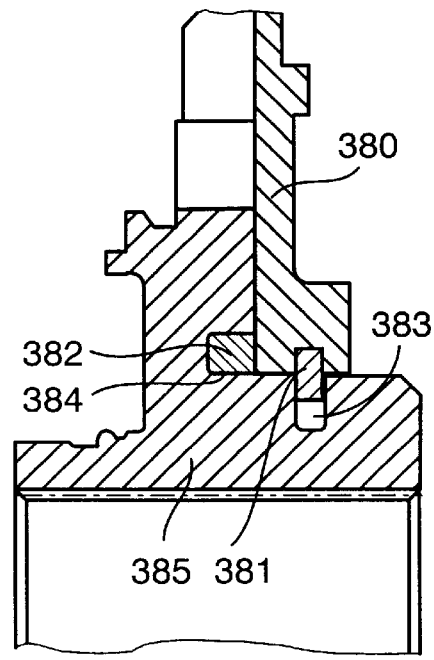
Figure 11A:
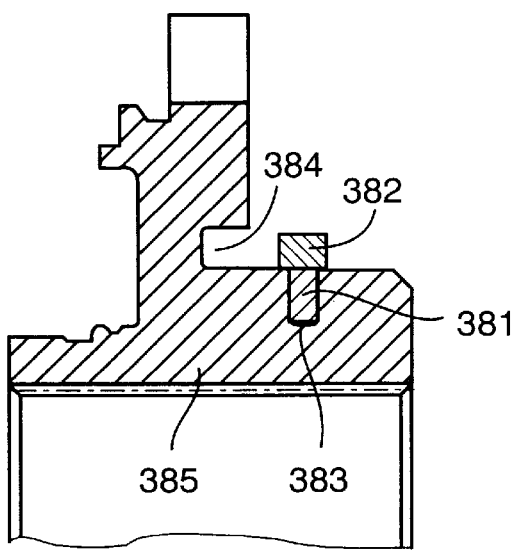
Figure 13:
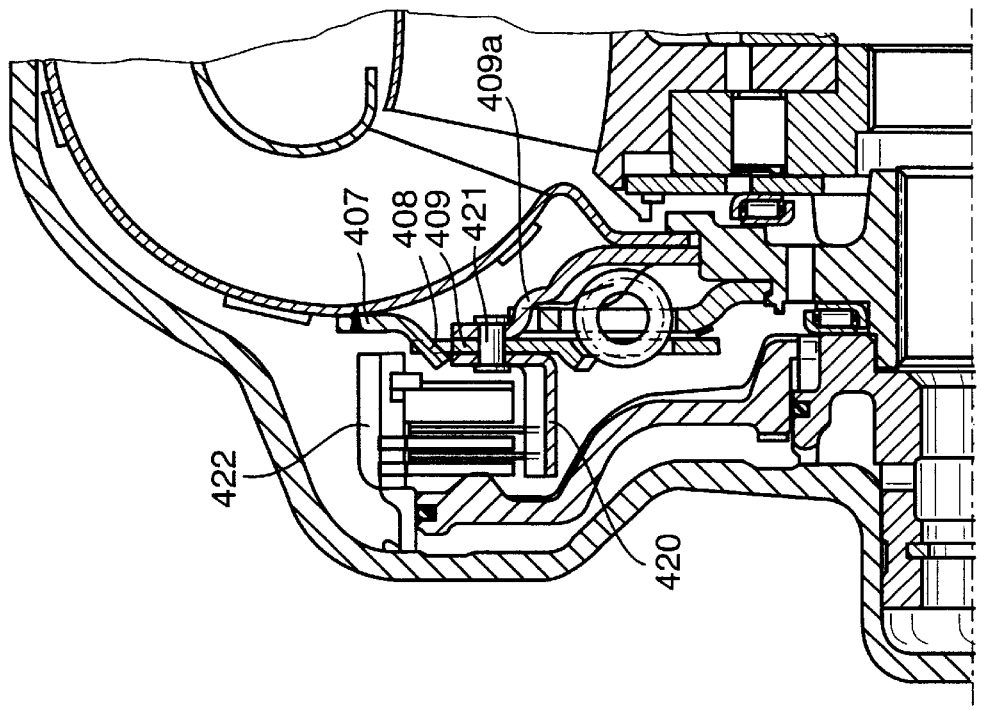
Figure 12:
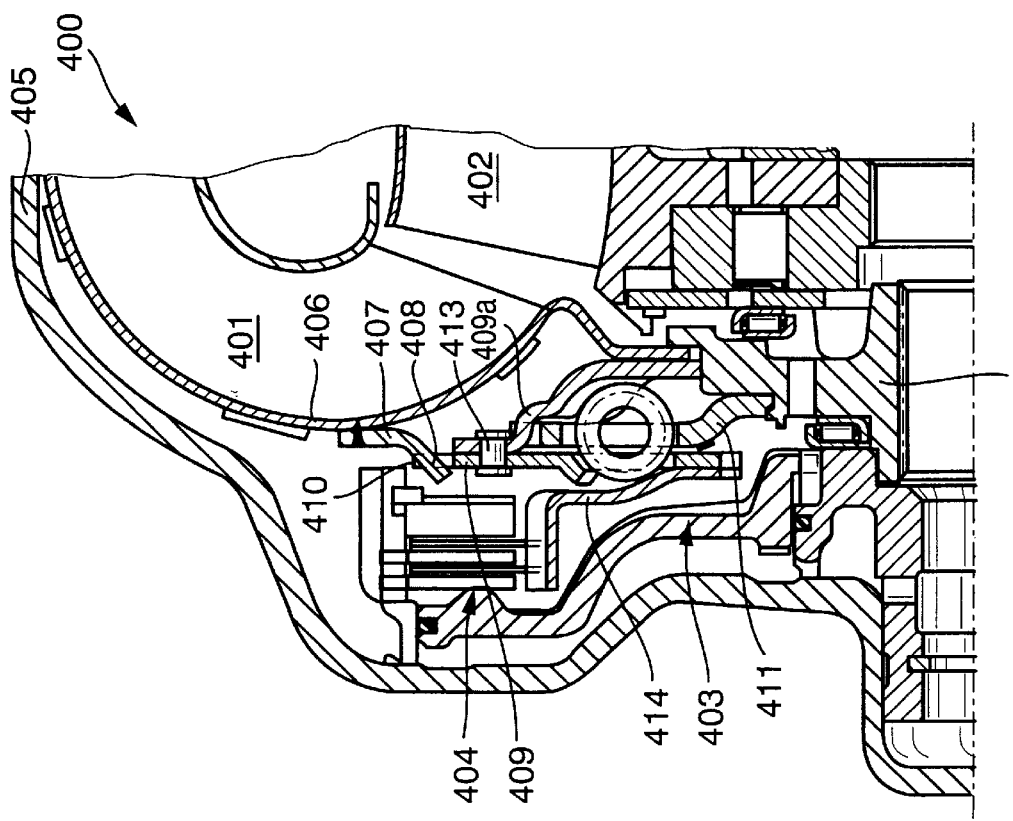
Figure 14:
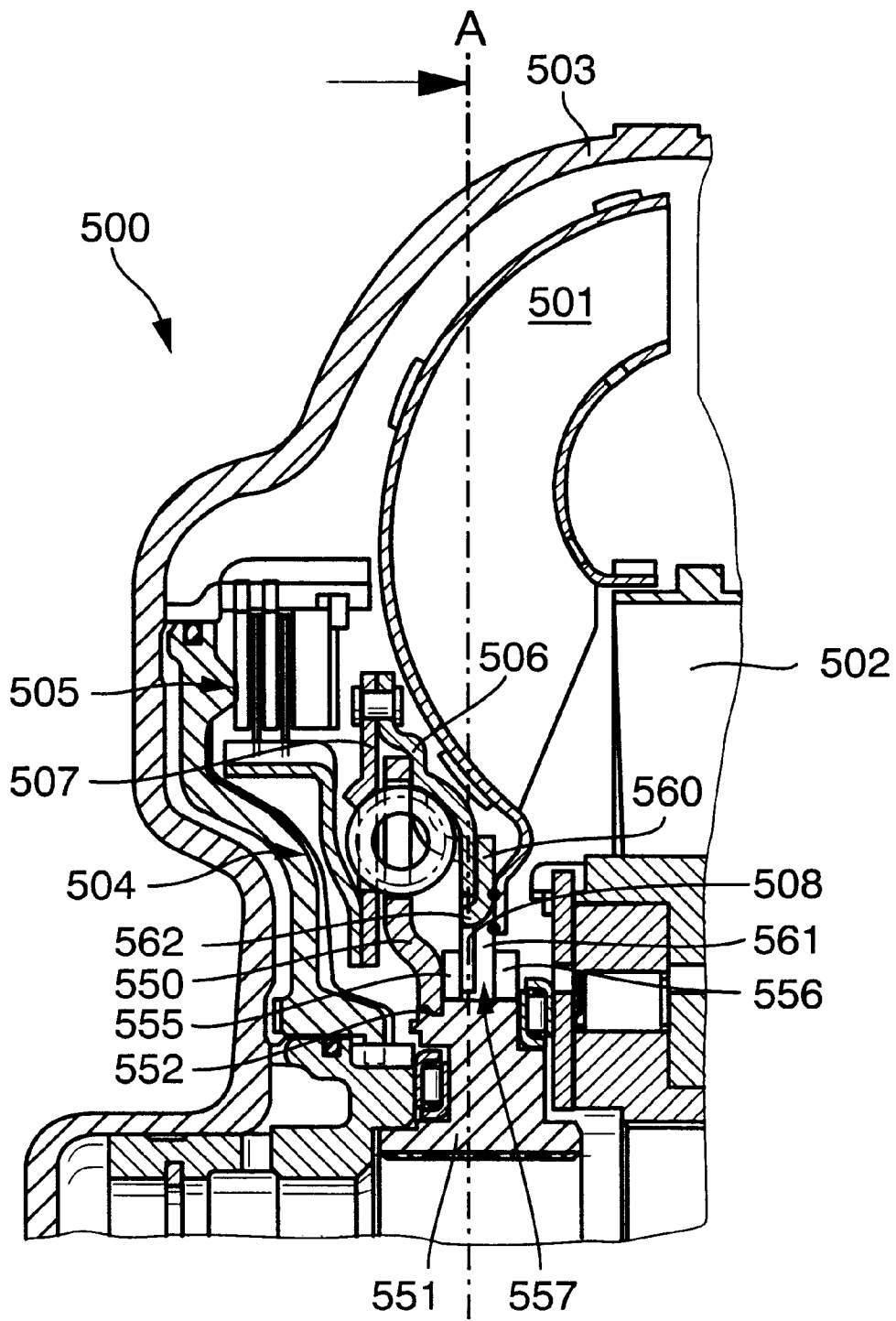
Figure 14A:
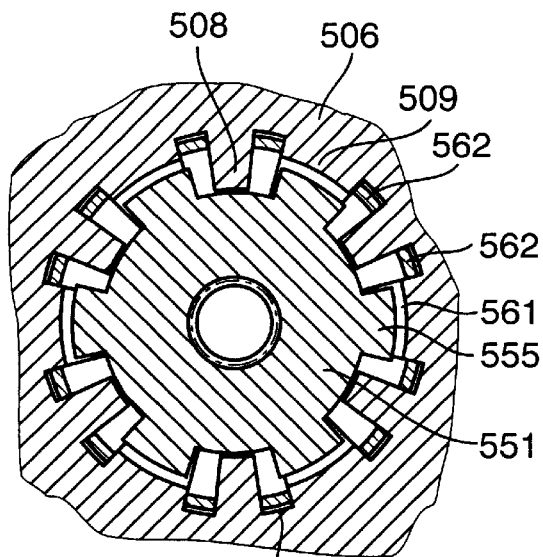
Figure 15:
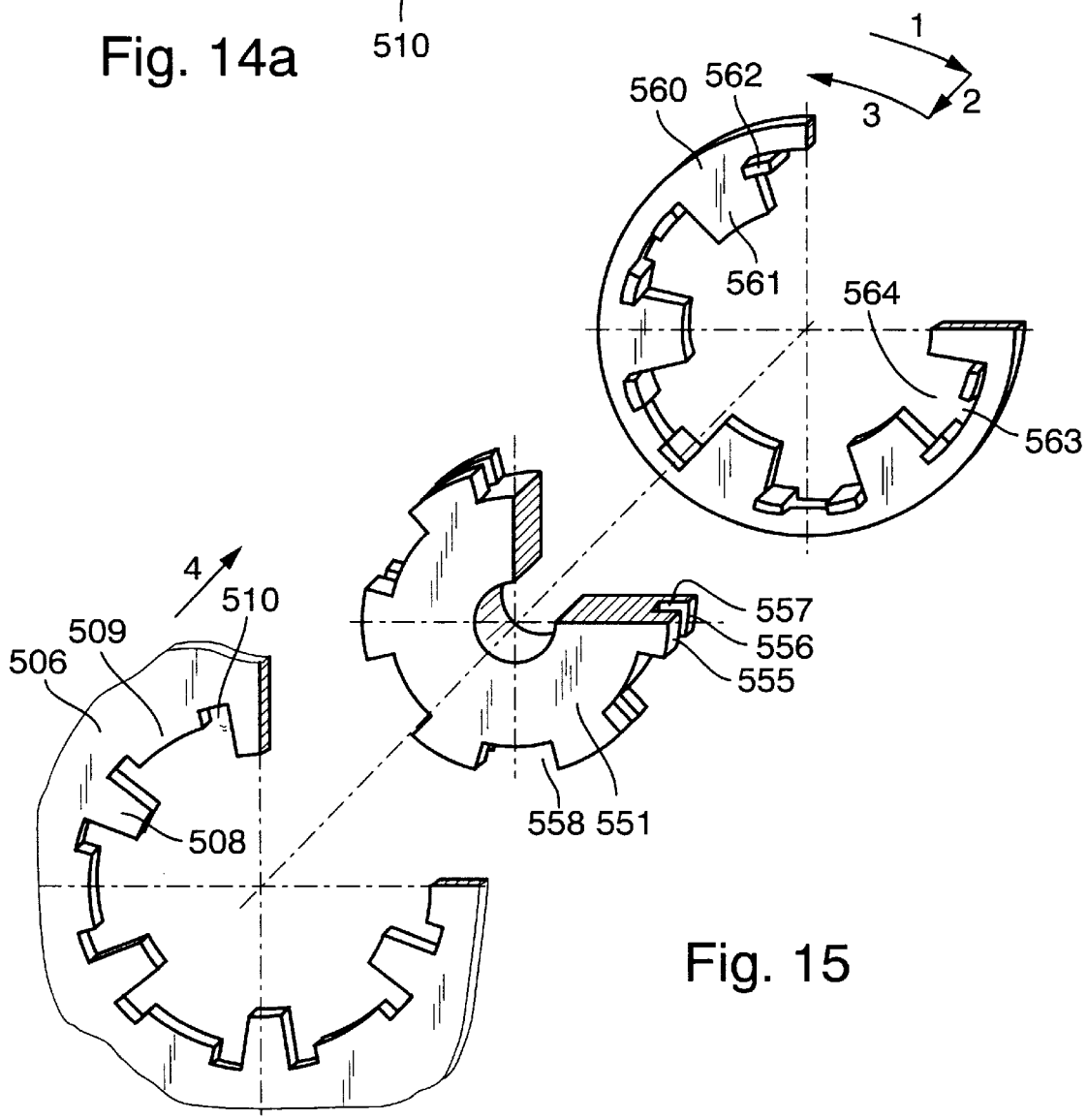

The invention will now be explained in further detail with reference to the embodiments shown diagrammatically in the drawings in which:

FIG. 1 is a sectional view of a torque converter;
FIG. 2 shows a section from FIG. 1;
FIG. 3 shows a section from FIG. 1;
FIG. 4 shows a section of FIG. 1;
FIG. 5 shows a graph;
FIG. 6 shows a section of FIG. 1;
FIG. 7a shows a section of a torque converter;
FIG. 7b shows a section from FIG. 7a;
FIG. 7c shows a view of a flange;
FIG. 8 shows a section of a torque converter;
FIG. 9 shows a section of a torque converter;
FIG. 10 shows a section of a torque converter;
FIG. 11 shows a section of a torque converter;
FIG. 11a shows a section of a torque converter;
FIG. 12 shows a section of a torque converter;
FIG. 13 shows a section of a torque converter;
FIG. 14 shows a section of a torque converter;
FIG. 14a shows a sectional view of a torque converter of FIG. 14 and
FIG. 15 shows an arrangement of component parts of a torque converter.

FIGS. 1 and 2 show a hydrodynamic torque converter 1 which can be provided inside a drive train of a vehicle having an engine and transmission, where the transmission is preferably an automatic shift step-change gearbox or a continuously variable cone pulley belt contact gearbox, such as a CVT transmission. The torque converter 1 has a housing which can be driven on the engine side and which consists of two housing shells 2, 3 which are preferably connected together rotationally secured fluid-tight through circumferential welding.

A pump wheel 4 is connected rotationally secured to the housing 2, 3 wherein one housing shell is formed as the shell for the pump wheel and supports the vanes of the pump wheel. Inside the housing there is also a turbine wheel 5 and a stator 6 which can be driven in the hydrodynamic fluid circuit of the converter wherein the pump wheel driven on the engine side drives the fluid circuit. The stator 6 is located on a stator hub 8 which can be supported by means of a freewheel clutch 9 such as for example a rolling freewheel, relative to a shaft 5 fixed on the housing in the conversion region of the torque converter and can be rotated in the coupling area of the converter.

The turbine wheel 5 has a turbine shell 11 which is provided with vanes 12a wherein the pump wheel and stator are likewise provided with vanes 12b, 12c. The turbine wheel 5 is connected in the radially inner area 11a of the turbine shell 11 to a turbine hub 13. This connection can be advantageously a welded area 14 or a positive-locking connection such as riveting.

The turbine hub 13 is located on an output hub 15 so that the radially inner cylinder sleeve face 16 of the hub 13 is located on an outer sleeve face 17 of the output hub 15 and is mounted to rotate relative to the output hub at least in a restricted angular range relative to same and is centred in the radial direction by means of same. The cylinder sleeve face 16 of the turbine hub 13 is advantageously located directly on the counter face, such as outside face 17 of the output hub 15 so that the surfaces 16 and 17 can slide on and relative to each other. The corresponding teeth of the output hub and turbine hub thus represent a centring device.

The turbine hub 13 is fixed in the axial direction relative to the output hub 15 through on the one hand the radially extending side face 20 of the output hub 15 and on the other through the radially extending security ring 21 by its side face 23. The security ring 21 is located in a circumferential groove 22 of the output hub. A releasable removable snap ring can be used as the security ring 21. The turbine 13 is thus in contact by its one side face 24 with the side face 20 of the output hub and by its other side face 25 at least in the radially inner area with the side face 23 of the security ring. The turbine hub 13 is thereby set axially rigid on the output hub 15 and rotatably supported at least over a predeterminable torsion angle. The radial bearing and axial bearing, such as slide bearing 16, 17, 20, 24, 23, 25 thus formed can also serve to centre the turbine wheel 5 on the output hub 15. Since the security ring 21 is releasable the turbine hub can also be removed again from the output hub. This is advantageous in the event of repairs being made to the torque converter. The bearing faces 16, 24, 25 of the turbine hub are formed in one piece or integral with the turbine hub. The bearing faces 17 and 20 of the output hub are formed in one piece or integral with the output hub wherein the bearing face 23 is connected detachable to the output hub in two parts.

In a further embodiment a ring, such as a contact plate, such as a slide disc, can still be mounted between the security ring 21 and the turbine hub, with the ring being hardened where necessary and housed axially and radially in a free area in the turbine hub.

Fitting the turbine hub directly with radial and axial bearings on the output hub preferably provides one advantageous development of the invention. It is thereby advantageous if at least one component part, such as turbine hub and/or the output hub are hardened, wherein more particularly the slide face radially inside on the turbine hub and/or the slide face radially outside on the output hub are hardened.

In a further embodiment according to the invention it is expedient if a sliding sleeve is housed between the surfaces 16 and 17. The sliding sleeve can be designed so that it is hollow cylindrical and basically except for its thickness in the radial direction has only an axial extension wherein the sliding sleeve is arranged to slide between the surfaces 16 and 17. The sliding sleeve can also have an I-shaped or U-shaped cross-sectional contour with arms provided at its axial ends and extending in the radial direction. In this embodiment at least one radially extending arm of the sliding sleeve comes into contact between the axial contact bearing areas between the faces 20, 24 and/or 25, 23.

When the turbine hub is supported directly on the output hub it is particularly advantageous if the turbine hub and/or the output hub are hardened in the region of the mutual bearing faces or track faces. Through this hardening with the embodiments according to the invention it is possible to eliminate the need for a contact bush set between the faces of the turbine hub and output hub.

The output hub 15 has on its radially inner hollow cylindrical surface an internal spline 30, such as an engaging gear, for the positioning of and rotationally secured driving connection with a gear input shaft 31 which has in turn as engaging gear such as an external spline.

The hub 15 has a substantially ring-shaped region 33 formed in one piece with the hub and extending in the radial direction on which a spline 32 is formed in the radially outer region.

The turbine hub 13 likewise has a spline 34 which is formed on an axial shoulder 35 or as an axial shoulder. The spline 35 is mounted axially next to the side faces 24, 25 and radially outside of the surface 16 of the turbine hub 13. The spline 34 and the shoulder 35 thus engage over the output hub 15 at least in part. The spline 34 of the turbine hub engages in the spline 32 of the output hub 15 with backlash so that the turbine hub can turn relative to the output hub in a predeterminable angular region, such as a free angle, and only after overcoming this free angle does the spline 32 come to stop with the spline 34 and a relative rotation between the hub 13 and the hub 15 is restricted.

The hydrodynamic torque converter 1 furthermore has a torsional vibration damper 40. The torsional vibration damper 40 is provided with an input part and output part wherein the input part and output part can rotate relative to each other in a predeterminable angular range against a resetting force of energy accumulators such as springs mounted between these parts.

The input part substantially comprises a first side disc 41 and a second side disc 42 which are connected together rotationally fixed by means of the connector 46, such as a rivet. At least one of the side discs 41 and 42 is made as a substantially circular ring-shaped disc of sheet metal. The side disc 41 has in its radially inner area a spline 41a formed by radially inwardly aligned tongues which engage rotationally rigid without backlash in the tooth gaps of the axially protruding teeth of the spline 35 of the turbine hub 13. The side disc 41 is centred in the radial direction through the flanks of the splines 35/41a. The corresponding splines of the side disc and turbine hub thus represent a centring device. The input part of the damper 40 is thereby centred on the turbine hub 13. The side discs 41 and 42 have outward curvatures or windows 47, 48 which hold the energy accumulators 49 circumferentially at least in part and which, viewed in the circumferential direction, form end stops for the contact bearing of the energy accumulators. Thus torque can be transferred from the input part of the damper 40 to the energy accumulators. The energy accumulator sockets 47, 48 can be formed by openings in the side parts or by fluid-tight outward curvatures in the side parts.

The side disc 41 can also be plastically re-formed axially in the radially inner area so that the toothed engagement between the input part of the damper and the turbine hub is produced through a spline in the region of the axially protruding inner region of the side disc.

A circular ring-shaped disc-like component part 50 is held axially between the side discs 41 and 42 which form the input part of the damper 40, and forms the output part of the damper 40. The disc-like component part 50, such as a flange, has sockets 51, such as windows in which the energy accumulators 49 of the damper 40 are housed. The windows have in the circumferential direction end stops which form a contact bearing surface for the end windings of the energy accumulators for torque transfer. The torque flow takes place from the two side discs 41, 42 through the spring window end faces to the energy accumulators 49 and from these through the end windings of the energy accumulators to the flange 50.

The socket areas 47, 48 and 51 of the energy accumulators 49 have radially outside contact bearing areas which engage round the energy accumulators at least in part in the radial direction. These serve to sustain the centrifugal force of the energy accumulators inside the socket area of the side disc and flange.

The flange 50 is connected as a disc-like component part radially inside to the output hub. The flange 50 is advantageously connected to the hub 15 by means of staking 52 or welding. A cost-effective manufacture of the output part of the torsional vibration damper can thereby be reached wherein the component part of the flange can be easily made for example as a stamped part and can be connected to the hub.

A particularly advantageous feature of the two-part manufacture of the flange and hub and their connection through staking or welding is the possible choice of various different materials for manufacturing the two component parts.

It is thereby possible to avoid a one-piece formation of the hub with flange through a cost and labour intensive method of manufacture, such as for manufacturing sintered hubs with an integral flange. The connection 52, such as staking, of the flange 50 with the output hub 15 is made in a region 53 of the output hub 15 which protrudes in the axial direction opposite the spline 32, with this axially protruding region being formed as a ledge.

Both the output hub and the turbine hub have openings 55 which serve for assembly. During assembly the position of the hub can be fixed. At the same time the openings serve for an improved flow of fluid during operation of the torque converter.

The energy accumulators 49 are mounted inside their sockets 47, 48, 51 whereby the energy accumulators are formed in one advantageous embodiment as pre-curved energy accumulators whose radially outer contour in side view substantially matches the substantially circular ring segment shaped windows 51. In a further embodiment the energy accumulators are formed as non-curved such as cylindrically wound energy accumulators which are inserted during assembly into the windows with the application of force.

The side disc 42 is connected to a circular ring-shaped element, such as plate support 43, of the torque converter lock-up clutch by means of connectors 44, 45 such as rivet connections. The rivets 44, 45 connect the side disc 42 rotationally secured to the plate support 43 and create a defined spacing between the radially outer region of the plate support 43 and the side disc 42. The plate support 43 has an axially extending ring-shaped region 43a which supports the plates and a radially extending region 43b which is connected to the one side disc. The two regions 43a, 43b of the plate support 43 are advantageously formed in one piece. The side disc 42, which is connected to the plate support is the side disc on the housing side, wherein the side disc on the turbine side is connected rotationally rigid to the turbine hub by means of a spline.

The energy accumulators 49 which can also be formed as pairs of energy accumulators boxed in each other are housed in the socket areas of the side discs and the flange so that the flange stands relative to the side discs in an operating situation unstressed by the energy accumulators so that the operating angle α in the drive direction is dimensioned differently from the operating angle β in the coast direction. The operating angle α in the drive direction is thereby greater than the operating angle β in the coast direction. In another advantageous embodiment it can also apply that the operating angle α in the drive direction is smaller than or equal to the operating angle β in the coast direction. The operating angle α in the drive direction is substantially in the range from 5 to 20 degrees, preferably in the range from 9 to 10.8 degrees, 10.9 degs. or from 11 to 15 degs. The operating angle β preferably lies in the range from 5 to 20 degs., more particularly and preferably in the range from 6 to 7.9 degs, 8 degs. or from 8.1 to 15 degs.

The side disc 41 is designed so that it has a tapering 60 in which it has a substantially circular ring shaped flat surface which acts as a friction surface. The flange 50 is supported on this friction surface by a side face 61 and thus forms a friction ring for vibration damping. An energy accumulator such as a plate spring is mounted between the flange 50 and the opposite side disc 42 and with its radially outer regions engages rotationally secured in windows 63 of the side disc 42 and with its radially inner ring area is supported on the side disc 42 biased by force. The flange is thereby positioned in the axial direction relative to the two side discs and a basic friction of the damper is produced.

The torque converter lock-up clutch 70 is designed as a multi-plate clutch, such as a friction disc clutch, with several lamella plates, such as internal plates and external plates. The torque converter lock-up clutch can in another embodiment also be formed as a friction disc clutch or a friction clutch with a friction disc such as with a friction surface and counter friction surface. The friction surface can thereby be fixed on an axially displaceable piston or can be formed in two pieces with same. The counter friction surface interacting therewith can be formed in one piece with the housing of the torque converter.

When using several friction discs there is a significant advantage in the compact structural form of the torque converter lock-up clutch since with a number of lamella plates as friction faces the effective friction surface remains or can even be increased despite a relatively small outside diameter. The radially outer plate support 71 is advantageously connected such as welded rotationally rigid to the housing of the hydrodynamic torque converter. Individual outside plates 73 are hung in the plate support 71 substantially rotationally secured but axially displaceable. Further inner plates 74 are mounted between these plates 73 and are connected rotationally rigid to the radially inner plate support 72 which is formed in one piece with the side disc 43. When the lamella plates are loaded with force in the axial direction to the turbine wheel, the individual plates are supported against one another and are supported in the axial direction on the radially outer contact bearing ring 71a which is connected to the plate support or is formed in one piece therewith. The outer lamella plate support 71 is thereby formed as a hollow cylindrical element, such as a ring element which is mounted coaxial or concentric with the axis of the gear input shaft.

A piston cylinder unit is mounted inside the housing of the torque converter in order to operate the torque converter lock-up clutch 70 of the hydrodynamic torque converter. The cylinder of the piston cylinder unit is formed by a radially extending wall 80 of the housing of the torque converter, as well as by radially inside and radially outside surfaces of the ring-shaped elements 81, 82. The component parts which form the ring cylinder are connected rotationally rigid to the housing or are formed in one piece with same. The ring cylinder which is thereby formed holds the piston 75, formed as a circular ring shaped component, such as a ring piston, axially displaceable. The piston 75 with its biasing region 75a biases the plates of the torque converter lock-up clutch against each other, whereby the clutch can be operated at least partially engaging or slipping. For this purpose the pressure chamber 76 is formed between the piston 75 and the housing which can be biased with pressurised medium from the central axis through bores through a shaft pin 176, wherein ducts formed inside the gear input shaft are in fluid connection with bores and ducts in the shaft pin. The piston 75 is mounted axially displaceable on the shaft pin 176 and is held rotationally secured through an engaging gear. The piston is thereby mounted rotationally secured relative to the housing. The piston has at its radially outer region a seal 79 which seals the pressure chamber radially on the outside. The seal is set in a circumferential groove in the piston. The piston is advantageously formed pressure-resistant.

By arranging the gearing between the turbine hub and the output hub at substantially the same axial level as the gearing between the input part of the damper and the turbine hub it is possible to reduce the axial length of the torque converter. At the same time it is advantageous that the disengaging gearing between the turbine hub and output hub is arranged radially inside the engaging gearing between the input part of the damper and the turbine hub. This is also therefore advantageous since a favourable load on the teeth of the gearing is produced with regard to the bending moment in the foot area of the teeth.

With a hydrodynamic torque converter described above in the event of an at least partially engaged, such as slipping, clutch the torque flow is on the one hand starting from the friction faces of the torque converter lock-up clutch to the input part of the torsional vibration damper, and on the other hand starting from the turbine wheel to the input part of the torsional vibration damper, wherein energy accumulators are mounted between the input part and output part of the torsional vibration damper, and the input and output part of the torsional vibration damper are rotatable against the resetting force of the energy accumulators. The torque transfer between the input and output parts of the torsional vibration damper takes place when there is no locked-up backlash between the turbine hub and output part of the damper through the energy accumulators of the damper, and in the event of a locked-up backlash between the turbine hub and output part of the damper the torque is passed directly through the pairs of gears.

In FIG. 4 the energy accumulators are shown in chain-dotted lines as lying behind the side disc. The energy accumulators are thereby marked 90 and 91 with the energy accumulators 90 being formed as long pre-curved energy accumulators which can be inserted without biasing into the circular ring shaped sockets whilst the energy accumulators 91 are formed as short non pre-curved or as precurved energy accumulators. The use of arcuate pre-curved energy accumulators such as arc springs has the advantage of a simplified faster assembly since the energy accumulators do not have to be pre-curved in order to be fitted into the sockets. The short energy accumulators can be formed with or without pre-curvature since in the case of short energy accumulators the curvature of the windows or sockets is only slight. The energy accumulators 90 and 91 are arranged so that seen in the circumferential direction two long energy accumulators 90 are arranged between the two short energy accumulators 91.

The sockets of the energy accumulators 90, 91 in the two side discs 41, 42 as an input part of the torsional vibration damper are designed so that in the event of no relative rotation between the flange and side discs the energy accumulators adjoin or practically adjoin the end stops of the sockets of the side discs viewed in the circumferential direction.

The sockets are thus in the circumferential direction substantially as long as the energy accumulators so that in one embodiment of the invention the energy accumulators are set loose without pretension in the sockets. This has the advantage according to the invention of a faster fitting of the energy accumulators.

In another advantageous embodiment the energy accumulators are mounted with a slight pretension in the sockets. This has the advantage that the energy accumulators without biasing as a result of a rotation between the flange and side discs cannot move freely and cause rattling noises.

The openings in the flange through which the energy accumulators engage are in part formed the length of the energy accumulators 90, 91 or extended beyond same so that with the same sized openings in the flange the energy accumulators 90 are biased between the end stops of the side discs and the flange even with small turning angles and the relative rotation takes place against the resetting force of the energy accumulators 90.

Through the loose fitting of the energy accumulators in the sockets of the side discs and/or the flange a slight backlash can exist between the input part and output part of the damper in the event of which the energy accumulators are still not yet biased and thus there is still no resetting force occurring between the input and output parts. The torsion damper characteristic (torque as a function of the torsional angle) thus has in a small angular range around the origin a path with a pitch of substantially zero. Only on reaching the torsion angle play does a positive or negative rise in the characteristic line occur in the drive or coasting direction.

In the case of the openings which are larger in the circumferential direction compared to the extension of the energy accumulators 91 the energy accumulators are only biased after exceeding a torsion angle between the flange and side discs so that the resetting force of the energy accumulators 91 between the input and output parts of the damper only operates after exceeding the backlash. A two-stage characteristic torque line is thus provided as a function of the torsion angle for the damper.

FIG. 5 shows a characteristic line 100 of the torsional vibration damper wherein the torque is shown as a function of the torsion angle. The characteristic line 100 has in a region from the start of the characteristic line up to the torsion angle 101*a*, 101*b* a characteristic which is independent of the torsion angle. This results from the fact that the energy accumulators are loose fitted (without pretension) in the sockets. The first energy accumulators are biased from the torsion angle 101*a*, 101*b* up to the torsion angles 102 or 104 and a characteristic line is provided having the same rise in the drive as in the coast direction.

At the torsion angle 104 the gearing between the turbine hub and output hub in the coast direction becomes disengaged and the characteristic line rises sharply.

At the torsion angle 102 the operating angle between the flange and the second energy accumulator is locked up and the second energy accumulators are biased in addition to the first energy accumulators. A steeper characteristic line thereby occurs from the torsion angle 102 until at the torsion angel 104 the gearing between the turbine hub and the output hub also becomes disengaged in the drive direction and the characteristic line rises sharply.

FIG. 6 shows a flange 110 without output hub. The flange 110 has sockets, such as spring windows 111, 112 in which the energy accumulators 113, 114 such as arcuate precurved energy accumulators are housed. The energy accumulators are preferably divided into long arc springs whose length viewed in the circumferential direction extend in an angular range from about 60 degrees multiplied by the mean radius R, and short springs whose length viewed in the circumferential direction extend in an angular range from about 20 degrees multiplied by the mean radium R. Thus the long springs 114 occupy an angular range in the region from about 60 degrees plus/minus 10 degrees. Of these long springs four are arranged spread out over the circumference. The short springs 113 occupy an angular range in the region from about 20 degrees plus/minus 5 degrees. Of these short springs 113 preferably two are arranged spread out round the circumference.

The extension of the windows viewed in the circumferential direction for housing the long energy accumulators 114 is substantially as long as the extension of the energy accumulators themselves although slight differences may occur if for example the springs are placed in the windows with or without force biasing. In the event of fitting without force biasing the windows are at least slightly larger than the springs.

The extension of the windows 111 viewed in the circumferential direction for holding the long energy accumulators 113 is substantially greater than the extension of the energy accumulators themselves. A predeterminable angular range (operating angle) in the region of 10 degrees, plus/minus 5 degs., is substantially provided between the end layers 116 of the energy accumulators 113 and the stops 115 of the windows. In the embodiment of FIG. 5 the operating angle is about 8.5 degrees so that the two-stage nature of the damper only becomes noticeable in the drive direction in the event of a torsion angel in the coast direction of 8 degrees.

The damper is designed so that it has a single-stage spring characteristic in the coast direction and a two-stage spring characteristic in the drive direction.

FIGS. 7a, 7b, and 7c show further advantageous developments according to the invention. The turbine wheel 201 is set in the housing of the torque converter 200 wherein a damper and torque converter lock-up clutch are also provided. The turbine hub 202 is mounted on the output hub 203. Compared with the support of the turbine hub on the output hub of FIGS. 1 or 2, in this embodiment the security ring is not provided between the turbine hub and output hub. The axial bearing of the turbine hub is provided by means of the rolling bearing 220 between the turbine hub 202 and stator hub 221.

The input part 207 of the damper is formed as a twofold connected disc-like element wherein the first disc-like element 207 and the second disc-like element 208 are connected together radially at the outside by means of a fastener 230, such as rivet. The output part 206 of the damper is formed as a circular ring-shaped component part 206 which is connected to the output hub 203 by staking 222.

Between the input part of the damper there is a play-free engaging gear in the region of the one disc-like element 207 and the turbine hub, with the gear being formed by the splines 209 and 204, with the one disc-like element 207 having one spline in its radially inner region and the turbine hub having a spline 204 in its axial region 204a wherein the two spline sets 209, 204 mesh with each other. The spline 204 is arranged axially next to the bearing of the turbine wheel on the output hub.

Between the turbine hub 202 and the output hub 203 there is a disengaging gear with backlash which is formed by the splines 205 and 204 wherein the output hub has a spline 205 in its radially outer region and the turbine wheel hub has a spline 204 in its axial region 204a and the two splines 205, 204 are in toothed engagement with each other with backlash. The spline 204 thus takes up radially on the outside the spline of the engagement part of the damper and radially on the inside the spline of the output hub.

The damper is formed as a two-stage damper where the energy accumulators 231 and 234 are housed in windows 232 and 233 of the flange 206 with and without play. The flange has radially on the outside teeth 235 which stop against a restriction 236 formed by radially inwardly pointing tongues of the side disc 207 when the maximum torsion angel between the flange and input part is reached.

FIGS. 8 and 9 show further developments according to the invention of a hydrodynamic torque converter 300 and 350. With these torque converters the turbine hubs 302 and 352 are made of sheet metal and are manufactured such as stamped and re-formed as shaped sheet metal parts. The shell 304 or 354 of the turbine wheel 301, 351 is thereby connected to the turbine hub 302, 352 through welding 303, 353.

The shaped sheet metal part 302 of the turbine hub has a radially outer edge area 305. Furthermore the hub 302 has a radially inner edge area 307 which is formed as a ring area and extends substantially in the axial direction. The ring area 306 radially inside on the turbine hub is produced by a stamping, imprinting or re-shaping process. A substantially cylindrical region 308 is thereby produced which has a cylindrical inside surface which serves as the bearing surface. The turbine hub is set and supported in this radially inner area of the output hub 310. The bearing surface 311 which extends in the radial direction is formed as an integral component part of the turbine hub. It comes into contact with a radially extending side surface of the output hub which serves as the axial bearing. The radially extending end surface 312 of the cylindrical region 308 likewise serves as a bearing surface which interacts with the side surface of the security ring 313 as the axial bearing. The security ring is housed as a releasable ring in a circumferential groove of the output hub.

In order to connect the turbine hub on one side with the output hub and on the other side with the input part of the damper tabs 315, 316 are formed in the axial direction which protrude like engaging teeth in the axial direction. The tabs 315 are thereby in toothed engagement with the teeth 317 of the output hub whereby backlash with a stop serves to restrict the torsion angle. The tabs 316 are in toothed engagement with the teeth 318 of the input part of the damper wherein substantially no backlash is present between the turbine hub and input part.

FIG. 9 shows an embodiment of the invention wherein a circular ring shaped sheet metal part is likewise provided as the turbine hub 352. In order to connect the turbine hub on one side to the output hub 355 and on the other side to the input part 356 of the damper there is an axially aligned region 357 protruding in the axial direction, viewed circumferentially, in the manner of gearing. The protruding region 357 is in toothed engagement with the spline 358 of the output hub wherein a backlash with a stop serves to restrict the torsion angle. The protruding region 357 is furthermore in toothed engagement with the spline 359 of the input part of the damper wherein substantially no backlash exists between the turbine hub and input part.

The embodiments of FIGS. 8 and 9 thus differ in that the toothed elements 315, 316 in FIG. 8 are combined as one element 357 in FIG. 9 wherein the radially inner region of the element 357 corresponds functionally to the element 315 and the radially outer region of the element 357 corresponds to the element 316. The toothed elements 315, 316 and 357 are created by plastic deformation, such as bending, flanging or through a stamping, counter-sinking or deep-drawing process.

The shell of the turbine wheel 304, 354 is connected in its radially inner region by means of at least one welded area 303, 353 to the turbine hub 302, 352.

Making the turbine hub as a shaped sheet metal part has the advantage according to the invention of a cost effective structure. The turbine hub made of sheet metal has the function of centering the turbine wheel, connecting with the input part of the damper and forming a stop after a predeterminable torsion angle to protect the springs so that the disengaging gearing between the turbine hub and output hub becomes blocked before the spring windings.

To fix the axial bearing 330 between the turbine hub 302 and the stator hub 332 of the stator 33 an I-shaped support such as cover disc is used which is connected radially on the outside to the stator and radially on the inside holds the bearing such as the rolling bearing.

FIGS. 10 and 11 show further developments according to the invention of the embodiment of FIG. 9 wherein the turbine hub 360 has axially protruding regions 362 which protrude opposite the base regions 361 for toothed engagement with a radially inner spline 363 of the output hub 364 and a radially outer spline of an input part of a damper.

The radially inner region 365 of the turbine hub 360 has an axially extending cylindrical surface which serves as a bearing face 375 and which houses the output hub in the region of a bearing face 376 radially inside the bearing face 375, wherein the two bearing faces interact as radial bearings. At the same time the radially inner region 365 has a radially extending surface 378 which can be formed as a wall as an integral constituent part of the turbine hub. This surface 378 is in contact with a radially extending surface 377 of the output hub 364. These two faces form an axial bearing.

Inside the output hub there are two circumferential grooves with one groove 368 formed in the radially inner region of the surface 377 and the other groove 367 formed in the region of the surface 376. These grooves house open or closed ring-shaped elements 369, 370. So that the one ring-shaped element 369, such as a security ring, cannot escape from the groove the turbine hub 360 has in the radially inner region at least one axially protruding tab 366 which restricts the ring 369 from escaping in the radial direction. Preferably several tabs 369 are provided spread out evenly or irregularly round the circumference of the turbine hub 360. The ring-shaped element 369 such as security ring can have an angular, rectangular, round or oval cross-section.

The axial bearing 371 and the support 371 of the axial bearing are also shown.

With reference to FIGS. 11 and 11a a self-locking security ring is shown here wherein a first radially outer ring 382 is mounted radially outside of a radially inner ring 381. The ring 381 is mounted inside the circumferential groove 383 of the output hub 385. By sliding the turbine hub 380 onto the output hub 380 in the axial direction the radially outer ring 382 is moved in the axial direction and positioned in the circumferential groove 384. By shearing off or shifting the ring 382 the ring 381 which is preferably formed as an open ring can relax and extend radially so that an undercut action occurs and the turbine hub 380 is axially secured. FIG. 11a shows an arrangement prior to pushing on the turbine hub and FIG. 11 shows an arrangement after pushing on the turbine hub. The outer ring 382 pretensions the inner ring 381 before the turbine hub is fitted.

FIGS. 12 and 13 show further advantageous embodiments of the invention. The hydrodynamic torque converter 400 has a pump wheel not shown), a turbine wheel 401 and a stator 402 wherein a torsional vibration damper 403 and a torque converter lock-up clutch 404 are also mounted inside the housing 405. The input part of the damper is formed by the two side discs 409, 409a which are connected together rotationally secured by means of the connector such as rivets, welding or screws. The flange 411 serves as the output part of the damper, with energy accumulators such as springs being arranged between the input and output parts and the input and output parts being able to rotate against the resetting force of the energy accumulators. The turbine wheel is connected rotationally secured by means of radially extending tongues 407 in the form of a spline 408 to the input part of the damper by means of a spline 410 in the radially outer region of the one side disc 409 radially outside of the energy accumulators. The tongues 407 can be formed as elements attached, such as welded, individually on the turbine shell 406 or can be formed in one piece with the ring as tongues mounted on the ring. Welding can thereby take place radially inside or outside of the outer plate support 422. The damper 403 is centred on an axially extending ledge of the output hub by means of the radially inner region of the one side disc 409a.

The radially inner plate support 414 is connected rotationally secured in the radially inner region radially inside the energy accumulators to the one side disc 409.

FIG. 13 shows a further development according to the invention of the torque converter wherein the radially inner plate support 420 is connected rotationally secured in the radially outer region radially outside of the energy accumulators by means of the connector 421 to at least the one side disc 409 and where applicable also the other side disc 409a. It can furthermore also be expedient if the side disc itself forms the plate support and for this purpose has an axially reformed region.

FIGS. 14, 14a and 15 show a further advantageous embodiment of the invention. The hydrodynamic torque converter 500 has a pump wheel (not shown), a turbine wheel 501 and a stator 502 wherein a torsional vibration damper 504 and a torque converter lock-up clutch 505 are also arranged inside the housing 503. The torsional vibration damper consists substantially of an input part which is formed by the two side discs 506, 507 which are connected together, such as riveted, in the radially outer region. The side discs have sockets for energy accumulators. A flange 550 is arranged as a damper output part between the side discs 506, 506 and is staked radially inside to the output hub 551 in the region 552.

The side disc 506 on the turbine side has radially inside tongues 508 and 509, with the tongues 508 extending radially further inwards than the tongues 509. Tooth gaps 510 are provided between the tongues 508 and 509.

The output hub 551 has spread out round its outer circumference two axially spaced teeth 555 and 556 which are separated from each other by axial spaced 557 and circumferential spaces 558.

The turbine hub 560 is formed as a shaped sheet metal part and is connected such as welded to the shell of the turbine wheel. It has on its inner region tongues 561 which are aligned radially inwards. Between these tongues is a tooth gap 564 and in the radially outer region of the gap there are tongues 562 shaped round in the axial direction so that each two tongues 562 i each gap 564 are spaced out by the gap 563.

To assemble the unit the circular ring-shaped sheet metal part of the turbine hub 560 is turned with its radially inwardly protruding tongues 561 and pushed onto the externally cogged hub 551 so that the tongues 561 engage in the gaps 558. The turbine hub 560 is then turned by an angle so that the tongues fit in the axial gaps 557 between the teeth 555 and 556 where they are fixed in the axial direction. This produces a type of bayonet lock. The damper is then pushed by its side disc 506 on the inside onto the output hub so that the tongues 508 engage between the axially protruding tongues 562 of the turbine hub and thus produce a rotationally secured connection between the turbine hub and input part of the damper. The damper is secured on the output hub by staking between the flange of the damper and the output hub itself. The tongues 508 engage in the external spline of the hub between the teeth 555 and serve as a damper stop with a predeterminable torsion angle. The teeth on the output hub are thereby formed so that with a maximum torsion angle of the damper between the input part and output part the tongues 561 cannot slip out from between the teeth 555 and 556.

The patent claims filed with the application are proposed wordings without prejudice for obtaining wider patent protection. The applicant retains the right to claim further features disclosed up until now only in the description and/or drawings.

References used in the sub-claims refer to further designs of the subject of the main claim through the features of each relevant sub-claim; they are not to be regarded as dispensing with obtaining an independent subject protection for the features of the sub-claims referred to.

The subjects of these sub-claims however also form independent inventions which have a design independent of the subjects of the preceding claims.

The invention is also not restricted to the embodiments of the description. Rather numerous amendments and modifications are possible within the scope of the invention, particularly those variations, elements and combinations and/or materials which are inventive for example through combination or modification of individual features or elements or process steps contained in the drawings and described in connection with the general description and embodiments and claims and which through combinable features lead to a new subject or to new process steps or sequence of process steps insofar as these refer to manufacturing, test and work processes.

What is claimed is:

1. Hydrodynamic torque converter having a pump wheel mounted inside a housing, a turbine wheel, a turbine hub, a stator, an output hub, and a torque converter lock-up clutch with an axially displaceable piston and a torsional vibration damper with an input part and output part which are able to rotate relative to each other at least against the resetting force of energy accumulators arranged between same, wherein the turbine hub is mounted in an axially fixed position on the output hub by means of at least one axial bearing and constrained in the radial direction by means of a radial bearing, a connection with backlash is provided between the turbine hub and the output hub by means of a first pair of toothed profiles allowing rotational play, a rotationally secured connection is provided between the input part of the torsional vibration damper and the turbine hub by means of a second pair of toothed profiles in rotationally rigid engagement, the first and second pairs of toothed profiles are mounted substantially at the same axial position and one of the first and second pairs of toothed profiles is mounted radially inside the other.

2. Hydrodynamic torque converter according to claim 1, wherein the output part of the torsional vibration damper and the output hub are formed in two parts and are connected by one of the connections consisting of staking and welding.

3. Hydrodynamic torque converter according to claim 1, wherein first energy accumulators mounted between the input part and output part of the torsional vibration damper are mounted between same substantially without backlash and second energy accumulators mounted between the input part and output part of the torsional vibration damper are mounted with backlash between same.

4. Hydrodynamic torque converter according to claim 3 the input part of the torsional vibration damper is formed by two disc-like component parts, fixedly connected together, and the output part of the torsional vibration damper, such as a flange, is formed by a disc-like element and is arranged axially between same, wherein first and second socket areas are provided for holding the first and second energy accumulators in the input and output parts, wherein the first and second socket areas of the input part and the first socket areas of the output part have in the circumferential direction substantially the extension of the energy accumulators in this direction, and the second socket areas in the output part have in the circumferential direction substantially a greater extension than the extension of the energy accumulators in this direction.

5. Hydrodynamic torque converter according to claim 4 wherein, the first energy accumulators in the event of torsion between the input and output parts of the torsional vibration damper are biased with force immediately or after a slight backlash between the input and output parts in the circumferential direction and the second energy accumulator sin the event of torsion between the input and output parts of the torsional vibration damper are only biased with force after a predeterminable torsion angle between the input and output parts in the circumferential direction.

6. Hydrodynamic torque converter according to claim 5, wherein the input part can rotate relative to the output part in the drive direction up to a first maximum torsion angle and in the coast direction up to a second maximum torsion angle.

7. Hydrodynamic torque converter according to claim 5, wherein the first maximum torsion angle is greater than the second maximum torsion angle.

8. Hydrodynamic torque converter according to claim 5, wherein the first maximum torsion angle is smaller than or equal to the second maximum torsion angle.

9. Hydrodynamic torque converter according to claim 1, wherein the predeterminable torsion angle between the input and output parts after exceeding which the second energy accumulators between the input and output parts of the torsional vibration damper are biased with force is smaller in the drive direction than the first maximum torsion angle.

10. Hydrodynamic torque converter according to claim 1, wherein the predeterminable torsion angle between the input and output parts after exceeding which the second energy accumulators between the input and output parts of the torsional vibration damper are biased with force is greater in the drive direction than the second maximum torsion angle.

11. Hydrodynamic torque converter according to claim 1, wherein at lest one of the energy accumulators is a curved energy accumulator whose outer contour is pre-curved in arc shape.

12. Hydrodynamic torque converter according to claim 1, wherein a bayonet lock is provided between the output hub, the turbine hub and the input part of the torsional vibration damper wherein a rotationally secured connection is provided between the turbine hub and the input part and rotational connection with backlash is provided between the output hub and the turbine hub.

13. Hydrodynamic torque converter according to claim 1, wherein the torque converter lock-up clutch is formed as a multi-plate clutch with a radially outer plate support and a radially inner plate support wherein the radially outer plate support is connected fixed to the housing and the radially inner plate support is connected rotationally secured radially outside of the energy accumulators of the torsional vibration damper to the input part of the torsional vibration damper.

14. Hydrodynamic torque converter according to claim 13, wherein the radially inner plate support has a cylindrical region and the connection between the plate support and the input part of the torsional vibration damper is provided radially outside of the cylindrical region.

15. Hydrodynamic torque converter according to claim 13, wherein the radially inner plate support has a cylindrical region and the connection between the plate support and the input part of the torsional vibration damper is provided radially inside the cylindrical region.

16. Hydrodynamic torque converter according to claim 1, wherein the torque converter lock-up clutch is formed as a multi-plate clutch with a radially outer plate support and a radially inner plate support wherein the radially outer plate support is connected fixed to the housing and the radially inner plate support is connected rotationally secured radially outside of the energy accumulators of the torsional vibration damper to the input part of the torsional vibration damper.

17. Hydrodynamic torque converter according to claim 1, wherein a rotationally secured connection is provided between the turbine wheel and the input part of the torsional vibration damper radially outside of the energy accumulators of the torsional vibration damper.

18. Hydrodynamic torque converter according to claim 1, wherein a rotationally secured connection between the turbine wheel and the input part of the torsional vibration damper is provided by means of tongues fixed on the turbine wheel and teeth radially outside on the input part of the torsional vibration damper.

19. Hydrodynamic torque converter according to claim 18, wherein the tongues are fixed individually on the turbine wheel.

20. Hydrodynamic torque converter according to claim 18, wherein the tongues are formed in one piece on a ring-shaped element and this element is fixed on the turbine wheel.

21. Hydrodynamic torque converter according to claim 1, wherein the axial bearing of the turbine wheel hub is provided by means of a security ring which has an outer ring and an inner ring and when fitting the turbine hub on the output hub the outer ring is released axially from the inner ring and the inner ring relaxes in the radial direction to secure the turbine hub.

22. Hydrodynamic torque converter according to claim 21, wherein the outer ring and the inner ring are formed in one piece and said one piece is designed so that the outer ring will break away from the inner ring at a predetermined location.

23. Hydrodynamic torque converter according to claim 21, wherein the outer ring and the inner ring are formed in two parts and are arranged radially one above the other.

24. Hydrodynamic torque converter according to claim 1, wherein the turbine hub is formed as a shaped sheet metal part.

25. Hydrodynamic torque converter according to claim 1, wherein the turbine hub is formed as a sintered part.

* * * * *